(12) United States Patent
Asao et al.

(10) Patent No.: US 10,211,709 B2
(45) Date of Patent: Feb. 19, 2019

(54) ELECTRIC POWER STEERING DEVICE

(71) Applicant: Mitsubishi Electric Corporation, Tokyo (JP)

(72) Inventors: Yoshihito Asao, Tokyo (JP); Akihiko Mori, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 218 days.

(21) Appl. No.: 15/117,324

(22) PCT Filed: Mar. 26, 2014

(86) PCT No.: PCT/JP2014/058623
§ 371 (c)(1),
(2) Date: Aug. 8, 2016

(87) PCT Pub. No.: WO2015/145630
PCT Pub. Date: Oct. 1, 2015

(65) Prior Publication Data
US 2016/0347354 A1    Dec. 1, 2016

(51) Int. Cl.
*H02K 3/28* (2006.01)
*H02K 5/22* (2006.01)
(Continued)

(52) U.S. Cl.
CPC .......... *H02K 11/33* (2016.01); *B62D 5/0406* (2013.01); *B62D 5/046* (2013.01); *H02K 3/28* (2013.01);
(Continued)

(58) Field of Classification Search
CPC .......... H02K 3/28; H02K 5/225; H02K 11/33; H02P 25/22; B62D 5/0206; B62D 5/046
(Continued)

(56) References Cited

U.S. PATENT DOCUMENTS 8,659,193 B2 * 2/2014 Yamasaki .............. H02K 11/33
310/64
9,338,925 B2 * 5/2016 Nakano ................ B62D 5/0406
(Continued)

FOREIGN PATENT DOCUMENTS

EP        2 634 066 A1    9/2013
JP     2006-204092 A      8/2006
(Continued)

OTHER PUBLICATIONS

JP 5414869_EN, Asao, English translation of JP 5414869, 2014.*
(Continued)

*Primary Examiner* — John K Kim
(74) *Attorney, Agent, or Firm* — Sughrue Mion, PLLC; Richard C. Turner

(57) ABSTRACT

In an electric power steering device, a power module includes a plurality of terminals including a motor control terminal and a power supply terminal connected to a power supply, each having a distal end portion being oriented toward a control board. A holder has holes through which the terminals pass. The terminals each have the distal end portion to be connected to the control board. A winding terminal has a distal end portion to be connected to the distal end portion of the motor control terminal. The control unit further includes a junction terminal. The junction terminal and the power supply terminal each having a distal end portion extending from the control board toward the connector assembly are respectively connected to connector terminals of the connector assembly.

9 Claims, 9 Drawing Sheets

(51) Int. Cl.
*H02K 11/33* (2016.01)
*B62D 5/04* (2006.01)
*H02P 25/22* (2006.01)

(52) U.S. Cl.
CPC ............ *H02K 5/225* (2013.01); *H02P 25/22* (2013.01); *H02K 2203/03* (2013.01)

(58) Field of Classification Search
USPC ........................................... 310/68 R, 71, 89
See application file for complete search history.

(56) References Cited

U.S. PATENT DOCUMENTS

| 9,450,476 | B2* | 9/2016 | Ito ........................... H02K 11/38 |
| 9,586,615 | B2* | 3/2017 | Asao .................... B62D 5/0406 |
| 2006/0158049 | A1 | 7/2006 | Suzuki et al. | |
| 2012/0313467 | A1 | 12/2012 | Omae et al. | |
| 2013/0062137 | A1 | 3/2013 | Motoda | |
| 2014/0091683 | A1* | 4/2014 | Ito ........................ B62D 5/0406 |
| | | | | 310/68 R |
| 2016/0347354 | A1* | 12/2016 | Asao .................... B62D 5/0406 |

FOREIGN PATENT DOCUMENTS

| JP | 2011-239574 | A | 11/2011 |
| JP | 2012-197051 | A | 10/2012 |
| JP | 2013-60119 | A | 4/2013 |
| JP | 2013-151206 | A | 8/2013 |
| JP | 5414869 | B1 | 2/2014 |
| WO | 2012/137322 | A1 | 10/2012 |
| WO | 2013/038572 | A1 | 3/2013 |
| WO | 2013/111365 | A1 | 8/2013 |
| WO | 2013/132584 | A1 | 9/2013 |

OTHER PUBLICATIONS

International Search Report for PCT/JP2014/058623 dated Jun. 17, 2014.
Communication dated Dec. 8, 2017, from European Patent Office in counterpart application No. 14887153.6.
Communication dated Jan. 3, 2018, from European Patent Office in counterpart application No. 14887153.6.

* cited by examiner

ELECTRIC POWER STEERING DEVICE

CROSS REFERENCE TO RELATED APPLICATIONS

This application is a National Stage of International Application No. PCT/JP2014/058623 filed Mar. 26, 2014, the contents of which are incorporated herein by reference in its entirety.

TECHNICAL FIELD

The present invention relates to an electric power steering device configured to assist a steering force on a steering wheel by an electric motor, and more particularly, to an electric power steering device in which the electric motor and a control unit are integrated.

BACKGROUND ART

In order to downsize related-art electric power steering devices, there has been proposed an electro-mechanically integrated electric power steering device including an electric motor combined with a control unit. As the structures thereof, there are given a so-called add-on type structure including the control unit placed on an outer periphery of the electric motor and a structure including the control unit provided inside the electric motor so as to be integrated coaxially therewith in a direction of an output shaft of the electric motor. The coaxially integrated structure is downsized in comparison to the add-on type structure.

In order to realize the coaxial integration, the structure of a motor control unit (MCU) is particularly required to be devised. There has been proposed, for example, a device described in Patent Literature 1.

The above-mentioned related-art device includes winding terminals extending from the electric motor, a heat sink, power modules (PMs) each constructing an inverter circuit, a control board on which a central processing unit (CPU) is mounted, a connector assembly, a relay member arranged between the PMs and the control board so as to electrically and structurally connect the PMs and the control board, and the like.

CITATION LIST

Patent Literature

[PTL 1] JP 2013-151206 A

SUMMARY OF INVENTION

Technical Problem

In the MCU of the related-art device, a large number of electrical connections are arranged in a complex manner. Soldering or welding is required at a plurality of positions in each of a plurality of different locations such as between the connector assembly and the control board, between the PMs and the control board, and between the PMs and the winding terminals of the electric motor. Thus, there is a problem in that long time is required for assembly.

The present invention has been made to solve the problem described above, and has an object to provide an electric power steering device with improved ease of assembly through re-examination and improvement of each of portions and the structure.

Solution to Problem

According to one embodiment of the present invention, there is provided an electric power steering device, including:
a control unit; and
an electric motor,
the control unit being configured to control drive of the electric motor and being arranged coaxially with an output shaft of the electric motor on a side opposite to an output side of the output shaft, the control unit and the electric motor being integrated with each other through connection between a motor control terminal of the control unit and a winding terminal of the electric motor,
the control unit including:
a case;
a connector assembly, which is provided on an outer side of the case;
a heat sink, which is configured to close an opening portion of the case to form a space in cooperation with the case;
a power module, which is placed on the heat sink within the space, and is configured to supply power to the electric motor;
a holder, which is configured to press the power module against the heat sink to bring the power module in close contact with the heat sink, and to position the power module; and
a control board, which is provided so as to be separate from the holder, the control board having mounted thereon a central processing unit (CPU) configured to control drive of the electric motor,
the power module including a plurality of terminals including the motor control terminal and a power supply terminal connected to a power supply, each having a distal end portion being oriented toward the control board,
the holder having holes through which the plurality of terminals pass, the terminals each having the distal end portion to be connected to the control board,
the winding terminal having a distal end portion to be connected to the distal end portion of the motor control terminal,
the control unit further including a junction terminal, the junction terminal and the power supply terminal each having a distal end portion extending from the control board toward the connector assembly being respectively connected to connector terminals of the connector assembly.

Further, according to one embodiment of the present invention, there is provided an electric power steering device, including:
a control unit; and
an electric motor,
the control unit being configured to control drive of the electric motor and being arranged coaxially with an output shaft of the electric motor on an output side of the output shaft, the control unit and the electric motor being integrated with each other through connection between a motor control terminal of the control unit and a winding terminal of the electric motor,
the control unit including:
a case;
a connector assembly, which is provided on a radially outer side of the case;
a heat sink, which is provided inside the case;

a power module, which is placed on the heat sink, and is configured to supply power to a motor winding of the electric motor;

a holder configured to press the power module against the heat sink to bring the power module in close contact with the heat sink, and to position the power module; and a control board provided so as to be separate from the holder, the control board having mounted thereon a central processing unit (CPU) configured to control drive of the drive motor, the power module including a plurality of terminals including the motor control terminal and a power supply terminal connected to a power supply, each having a distal end portion being oriented toward the control board, the holder having holes through which the plurality of terminals pass, the holes each having the distal end portion to be connected to the control board, the winding terminal having a distal end portion to be connected to the distal end portion of the motor control terminal, the control unit further including a junction terminal, the junction terminal and the power supply terminal each having a distal end portion extending from the control board toward the connector assembly being respectively connected to connector terminals of the connector assembly.

Advantageous Effects of Invention

According to the electric power steering device of the present invention, main connection work can be implemented at connecting portions that are close to each other, and hence the ease of assembly is improved thereby.

DESCRIPTION OF EMBODIMENTS

Figure 1:
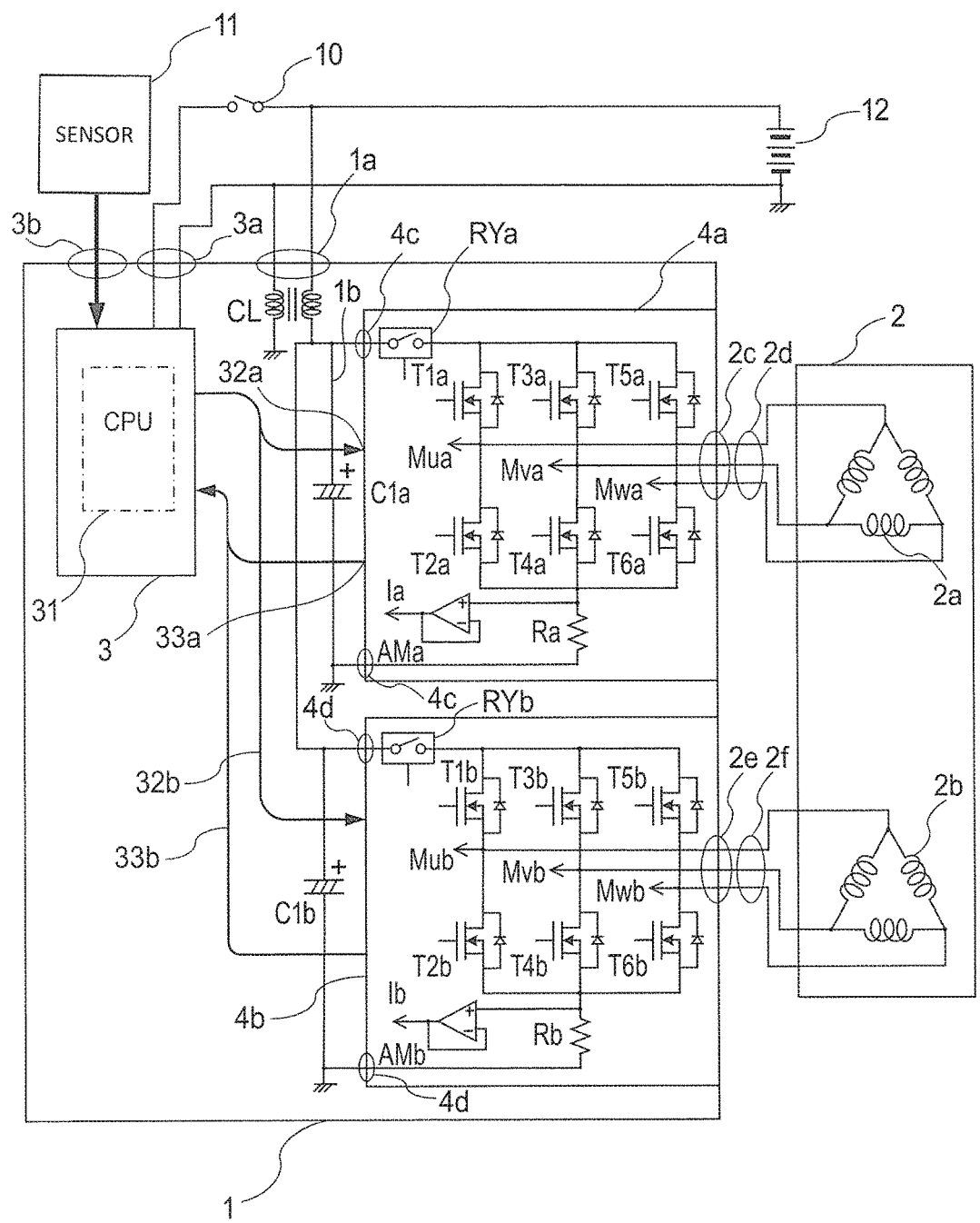
FIG. 1 is a circuit diagram for illustrating an electric power steering device according to a first embodiment of the present invention.

Now, an electric power steering device according to each of embodiments of the present invention is described referring to the drawings. In the drawings, the same or corresponding members and parts are denoted by the same reference symbols for description.

First Embodiment

FIG. 1 is a circuit diagram for illustrating an electric power steering device (hereinafter abbreviated as "device") according to a first embodiment of the present invention.

The device includes a control unit 1, an electric motor 2 configured to assist a steering force on a steering wheel (not shown), sensors 11, such as a torque sensor configured to detect the steering force on the steering wheel and a vehicle-speed sensor, and a battery being a power supply, which are respectively mounted at predetermined locations in a vehicle.

The control unit 1 includes, as main components, a control board 3 on which a central processing unit (CPU) 31 and the like are mounted, and power modules (hereinafter abbreviated as "PMs") 4a and 4b respectively forming so-called inverter circuits configured to supply currents to motor windings 2a and 2b.

The electric motor 2 is a brushless electric motor and includes two sets of the three-phase motor windings 2a and 2b in this embodiment. However, the electric motor is not limited to the brushless electric motor with two sets of three-phase motor windings, and may be a brush electric motor or a multi-phase winding electric motor having three or more phases.

The electric motor 2 includes the two sets of motor windings 2a and 2b. Therefore, even as the PMs 4a and 4b, two sets of the PM 4a and the PM 4b are used respectively for the motor windings 2a and 2b.

Next, the PMs 4a and 4b are described. The PMs 4a and 4b have the same circuit configuration. Therefore, one PM 4a is described, and the description of the other PM 4b is omitted.

Three sets (T1a to T6a) of switching elements connected in series (T1a and T2a) are built in the PM 4a. Besides, a relay RYa (which may also be replaced by a switching element) capable of interrupting power supply, a shunt resistor Ra capable of detecting a current, an amplifier AMa therefor, and the like are built therein.

Further, in the PM 4a, signal lines from the control board 3 are respectively connected to the switching elements (T1a to T6a), whereas monitor lines configured to transfer voltage values of portions of the PM 4a to the control board 3 are connected to the control board 3.

For example, the portions at which the voltages are respectively detected include winding terminals 2d, intermediate points Mua, Mva, and Mwa between the series-connected switching elements, and an output terminal Ia of the amplifier AMa that amplifies a difference in potential across both ends of the shunt resistor Ra. Motor control terminals 2c configured to supply a current to the motor winding 2a of the electric motor 2 are also connected to the intermediate points Mua, Mva, and Mwa between the series-connected switching elements.

Therefore, as terminals of the PM 4a, there are provided third power supply terminals 4c electrically connected to the battery 12, the motor control terminals 2c, signal line terminals 32a, and monitor line terminals 33a.

At least one capacitor C1a is connected to each of the PM 4a and the PM 4b so as to suppress power fluctuation and noise through current control for the electric motor. The capacitor C1a is a relatively large-sized component, and is arranged separately from the PM 4a and the control board 3.

In the drawings, each of components of the PM 4b is denoted with the index "b" in place of "a" that denotes each of the components of the PM 4a.

The motor control terminals 2c and the winding terminals 2d of the PM 4a correspond to motor control terminals 2e and winding terminals 2f of the PM 4b, and the third power supply terminals 4c of the PM 4a correspond to fourth power supply terminals 4d of the PM 4b.

A circuit configuration of the above-mentioned device is the same as that of a related-art device.

The control board 3 includes second power supply terminals 3a and sensor terminals 3b. The second power supply terminals 3a and the sensor terminals 3b are connected from the control unit 1 to the exterior through connectors.

On the other hand, the third power supply terminals 4c of the PM 4a and the fourth power supply terminals 4d of the PM 4b are connected to the battery 12 through first power supply terminals 1a.

A switch 10 is an ignition switch of the vehicle. When the switch 10 is turned ON, power is supplied to the control board 3 through the second power supply terminals 3a.

The electric motor 2 is directly connected to the battery 12 through the PMs 4a and 4b.

Coils CL for preventing noise emission are provided between the power supply and a ground. In the vicinity thereof, other capacitors and the like (not shown) are also connected.

The structure of the above-mentioned device in which the control unit 1 and the electric motor 2 are integrated is described.

Figure 2:
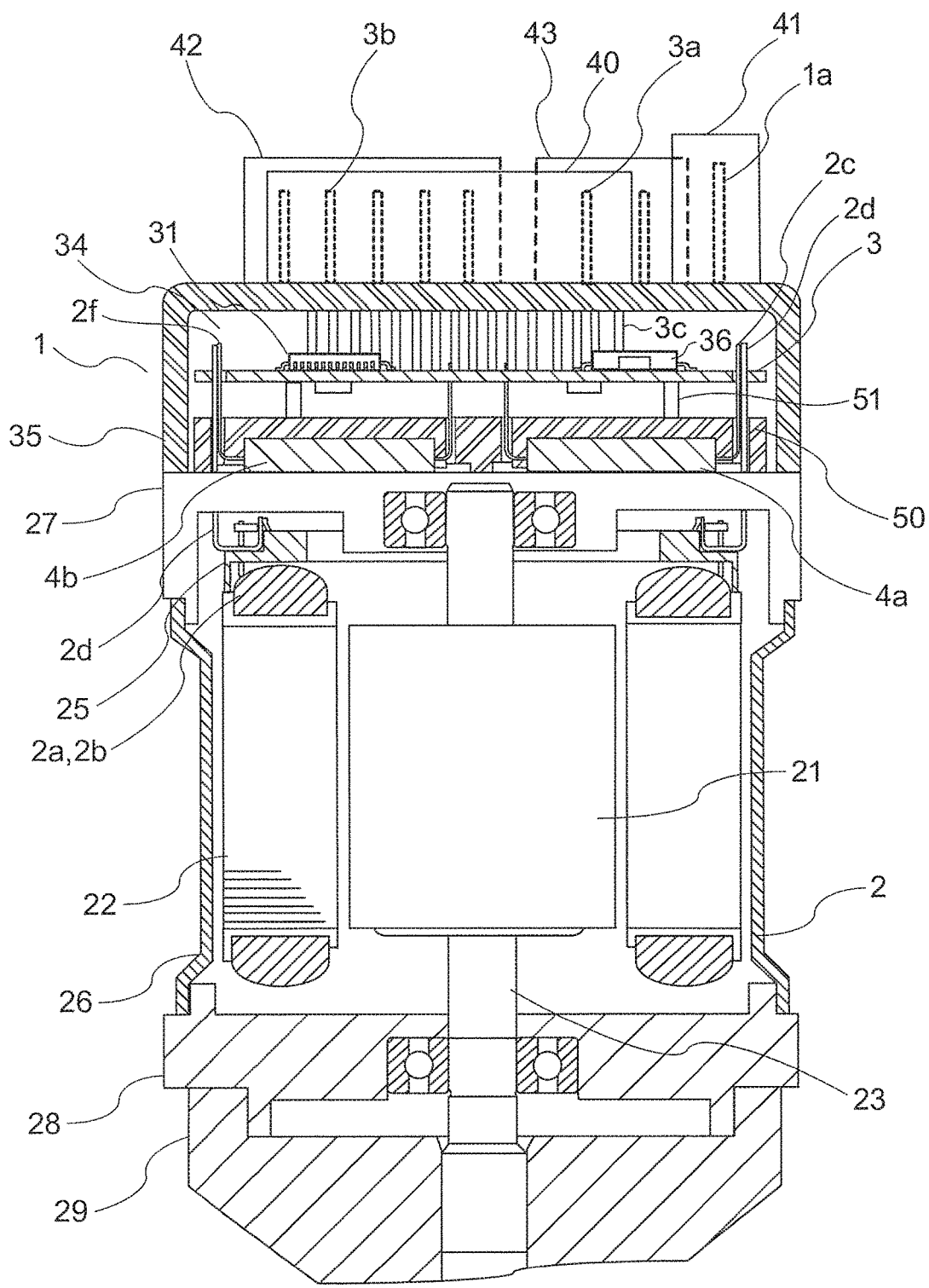
FIG. 2 is a sectional view for illustrating the electric power steering device illustrated in FIG. 1.
Figure 3:
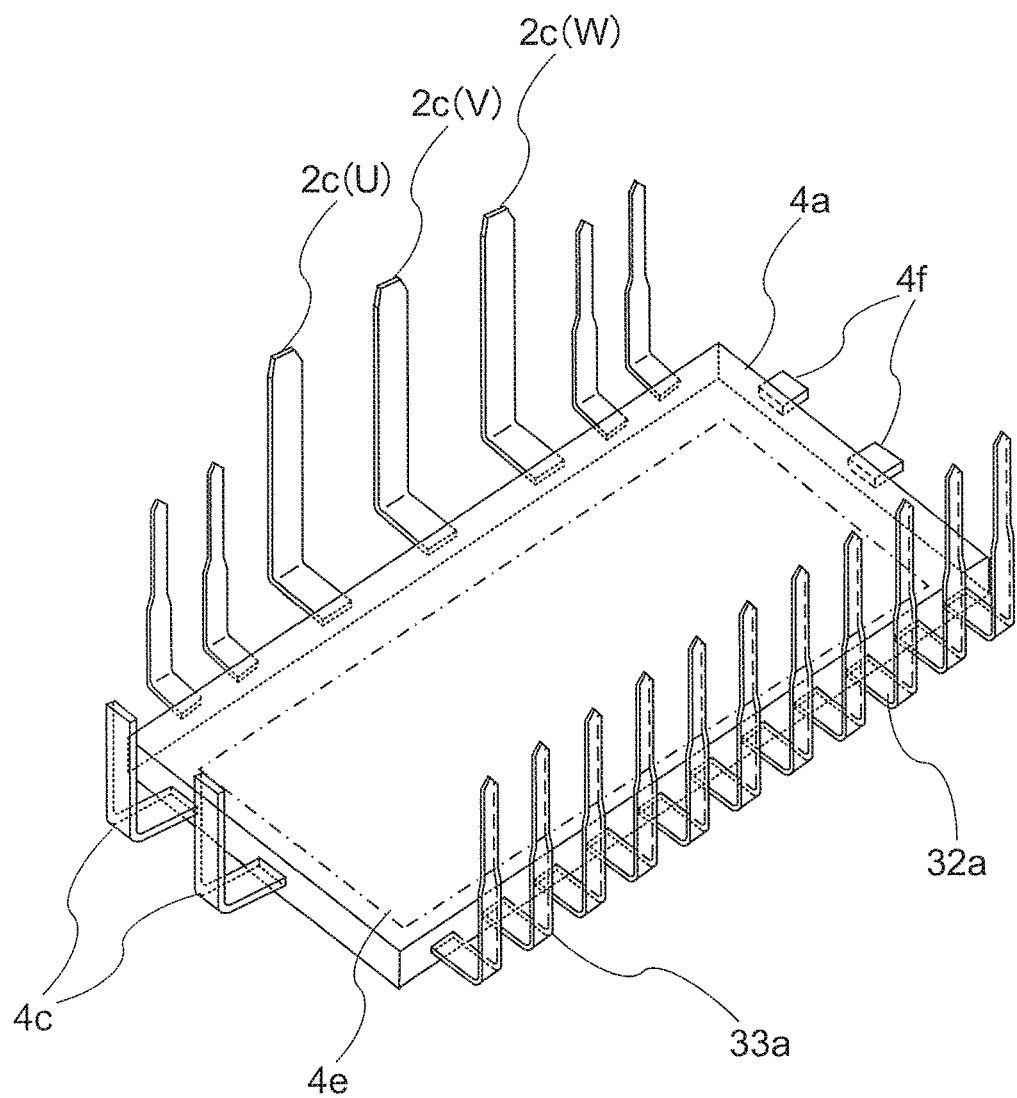
FIG. 3 is a perspective view for illustrating a power module illustrated in FIG. 1.
Figure 4:
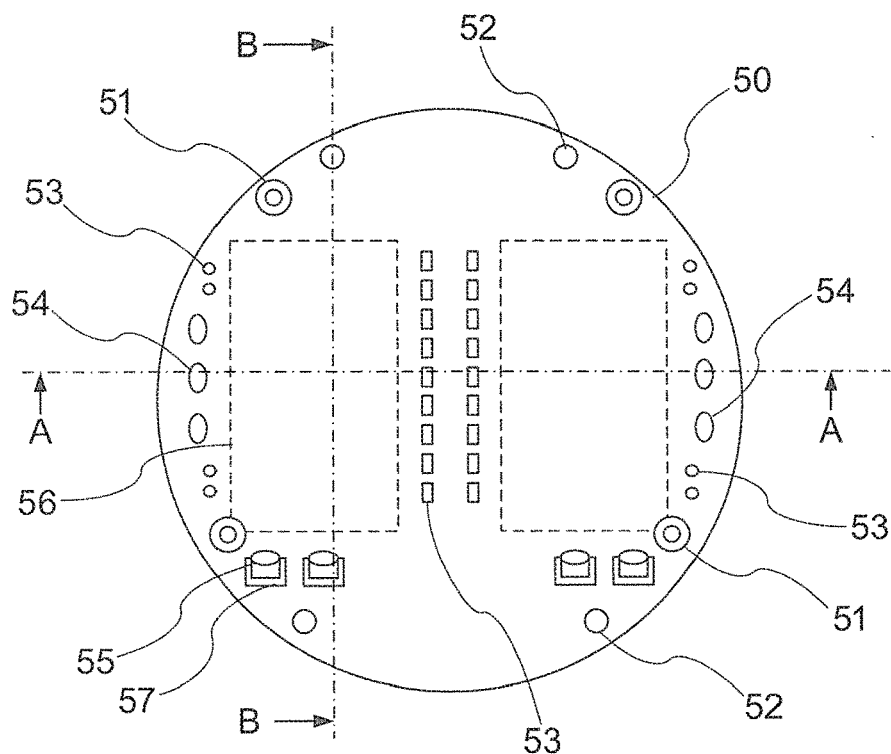
FIG. 4(a) is a plan view for illustrating a holder illustrated in FIG. 2.
FIG. 4(b) is a sectional view when viewed in a direction of the arrows taken along the line A-A in FIG. 4(a)
FIG. 4(c) is a sectional view when viewed in a direction of the arrows taken along the line B-B in FIG. 4(a).
Figure 4:
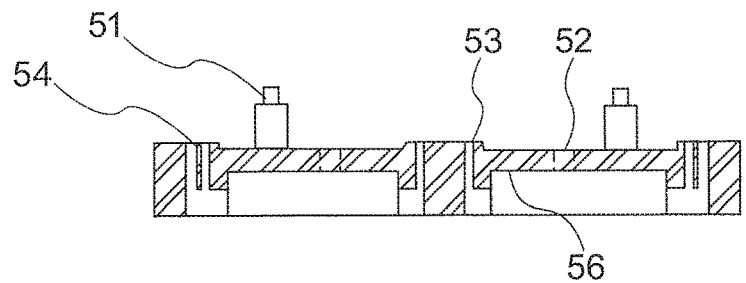
Figure 4:
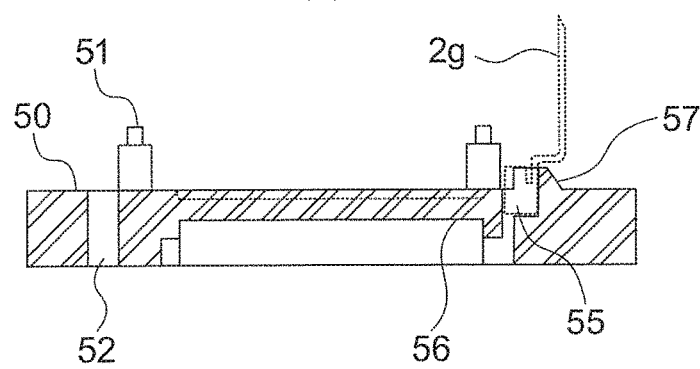
Figure 5:
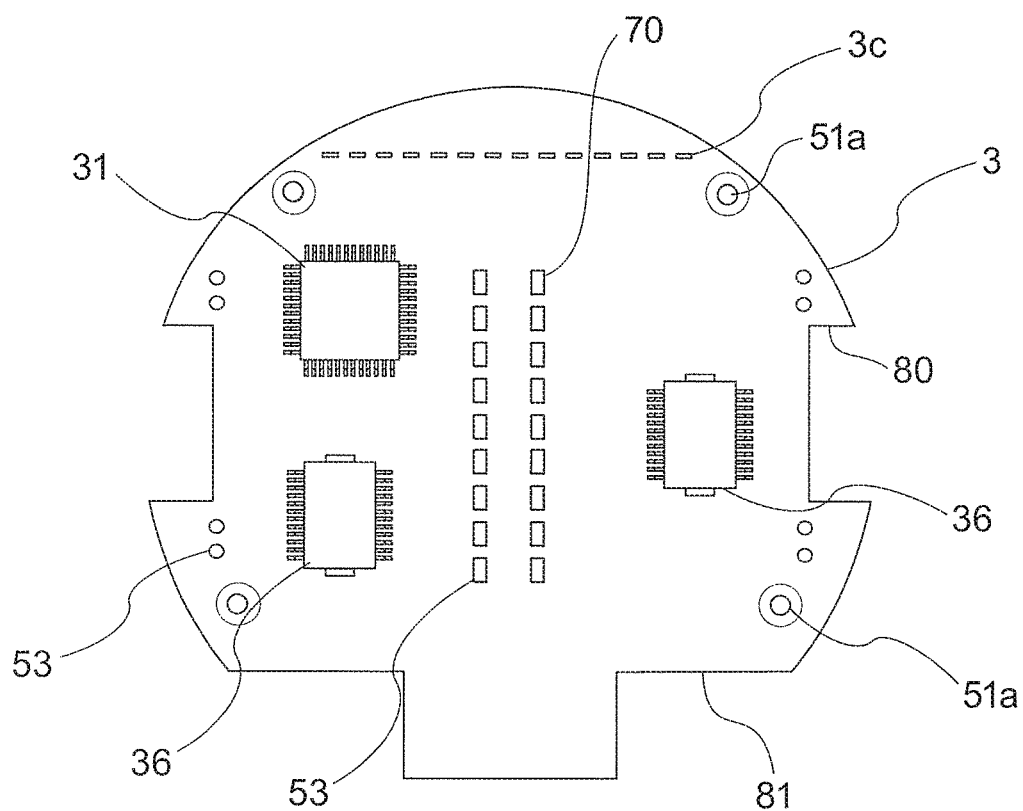
FIG. 5 is a plan view for illustrating a control board illustrated in FIG. 2.

FIG. 2 is a sectional view for illustrating the device illustrated in FIG. 1, FIG. 3 is a perspective view for illustrating the PM 4a illustrated in FIG. 1, FIG. 4(a) is a plan view for illustrating a holder 50 illustrated in FIG. 2, FIG. 4(b) is a sectional view when viewed in a direction of the arrows taken along the line A-A in FIG. 4(a), FIG. 4(c) is a sectional view when viewed in a direction of the arrows taken along the line B-B in FIG. 4(a), and FIG. 5 is a plan view for illustrating the control board 3 illustrated in FIG. 2.

In FIG. 2, a lower side in the drawing sheet is an output side of the electric motor 2, and the control unit 1 is arranged on a side opposite to the output side of the electric motor 2.

The electric motor 2 includes an output shaft 23 in a center thereof, similarly to the related-art device. A rotor 21 having permanent magnets (not shown) mounted on an outer peripheral surface thereof is fixed to the output shaft 23. A stator 22 around which the two sets of three-phase motor windings 2a and 2b are wound is arranged around the rotor 21. The stator 22 and the rotor 21 are housed in a space formed by a housing 26, a lower frame 28, and an upper frame 27. A lower side of the lower frame 28 is connected to a speed reducer 29 to which rotation of the output shaft 23 is transmitted.

For ends of the windings of the electric motor, a connection ring 25 configured to connect winding portions in delta (A) connection, for example, as illustrated in FIG. 1 is arranged on the top of the motor windings 2a and 2b. Hence, the two sets, that is, six winding terminals 2d and 2f in total extend upward.

A magnetic field is generated by supplying a current to the winding terminals 2d and 2f. Under repelling and attracting actions against and to the permanent magnets mounted on the outer peripheral surface of the rotor 21, the rotor 21 rotates.

The control unit 1 includes the two PM 4a and PM 4b, the holder 50, and further the control board 3 on which the CPU 31 and drive ICs 36 are mounted, which are sequentially placed in a space 34 enclosed by the upper frame 27 and a case 35 in the stated order from a lower layer in FIG. 2.

As illustrated in FIG. 3, each of the PMs 4a and 4b in a lowermost layer includes a plurality of various terminals provided on a molded body having a cuboidal shape, which are bent at a right angle in the middle so that distal end portions thereof extend upward.

The plurality of switching elements T1a to T6a, the relay RYa, the shunt resistor Ra, and the like illustrated in FIG. 1 are built in the molded body of the PM 4a illustrated in FIG. 3. The molded body has a window portion 4e, which is formed on a back surface thereof, and is configured to radiate heat from the built-in elements and the like. From the window portion 4e, an unmolded inner frame is exposed. The window portion 4e is held in close contact with an upper surface of the upper frame 27 that is a heat sink illustrated in FIG. 2 to improve heat radiating properties. Specifically, the upper frame 27 has not only a function as a boundary wall between the electric motor 2 and the control unit 1, but also a heat radiating function.

Similarly to the PM 4a, the PM 4b has a molded body having the same shape, and includes the same components built therein.

The motor control terminals 2c(U), 2c(V), and 2c(W), each having a relatively large width, extend from one longitudinal side of each of the molded bodies of the PMs 4a and 4b to be bent in the middle so that distal end portions thereof extend upward to enable connection to each of the winding terminals 2d and 2f of the electric motor 2. A large number of terminals, each having a relatively small width, extend from a side opposed to the one longitudinal side to be bent in the middle so that distal end portions thereof extend upward. The terminals include signal line terminals 32a and monitor line terminals 33a that are electrically connected to the control board 3, some of which extends from the side where the motor control terminals 2c(U), 2c(V), and 2c(W) are provided.

Further, the third power supply terminals 4c (for the power supply and the ground) extend from a short side of the molded body of the PM 4a, and fourth power supply terminals 4d extend from a short side of the molded body of the PM 4b. The terminals 4c are also formed to have a relatively large width.

Further, the terminals 2c, 32a, 33a, 4c, and 4d having a shape linearly symmetrical with respect to a virtual central line of the arrangement of the pair of PM 4a and PM 4b are arranged in this embodiment, and hence the two kinds of PM 4a and PM 4b are basically required to be manufactured.

In this embodiment, however, the above-mentioned arrangement is embodied with one kind of the PMs.

Specifically, with respect to the one PM 4a, the other PM 4b is arranged point-symmetrical with respect to the output shaft 23 as a center. Terminals 4f for power supply terminals are similarly extended from the side opposed to the third power supply terminals 4c illustrated in FIG. 3. For use as the PM 4a, the terminals 4f are cut short. On the other hand, for use as the PM 4b, the third power supply terminals 4c are cut, and the terminals 4f are used as the fourth power supply terminals 4d.

The PM 4a and the PM 4b as illustrated in FIG. 3 are arranged on the upper frame 27 in two rows in parallel so that each of the terminals extends upward.

The holder 50 that covers the PMs 4a and 4b is made of an insulating resin, and has an approximately disc-like shape as illustrated in FIGS. 4. A large number of through holes formed in the holder 50, through which the above-mentioned terminals respectively pass.

As illustrated in FIG. 4(a), bolt through holes 52 are formed at four positions so that pairs thereof on the right side and the left side are opposed to each other. Through bolts are inserted into and fastened to the bolt through holes 52, thereby positioning and fixing the holder 50 with respect to the upper frame 27.

Further, the holder 50 has line holes 53 formed in a central portion in rows so as to allow the line terminals 32a and 33a extending from the PM 4a and the line terminals 32b and 33b extending from the PM 4b to pass therethrough.

Further, in an outer peripheral edge portion thereof, three control holes 54 for allowing the motor control terminals 2c(U), 2c(V), and 2c(W) to respectively pass therethrough are formed for each so as to be opposed to each other. Further, on a lower side in FIG. 4(a), two power supply holes 55 for allowing the third power supply terminals 4c and the fourth power supply terminals 4d to pass therethrough are formed on each of the right side and the left side.

The holes 52, 54, and 55, each having a relatively large diameter, may be slits or cutaways, and are not limited to the holes as long as the terminals can be inserted therein to pass therethrough from the back surface to a front surface of the control board 3.

On a back surface of the holder 50, concave portions 56, each having a rectangular shape along an outer periphery of the molded body of each of the PMs 4a and 4b, is formed. The molded bodies of the PMs 4a and 4b are fitted into the concave portions 56. On a surface thereof, four tubular columns 51, each having a cylindrical shape, are arranged. One of the functions of the holder 50 is to position and press the PMs 4a and 4b with respect to and against the upper frame 27.

The holder 50 itself is positioned with respect to the upper frame 27 by fastening the through bolts passing through the bolt through holes 52. The molded body of each of the PMs 4a and 4b is brought into abutment against the concave portion 56 so that each of the PMs 4a and 4b is pressed against the upper frame 27 to be held in close contact with the upper frame 27. As a result, heat of each of the PMs 4a and 4b is conducted to the upper frame 27 to enhance heat radiation properties.

The concave portions 56 surrounding all the peripheral surfaces of outer shapes of the PMs 4a and 4b are not necessarily required. Only a pair of long sides and a plurality of portions of the molded body of each of the PMs 4a and 4b may be pressed in place of the concave portions 56.

Further, each of the holes 53, 54, and 55 of the holder 50 has a function of positioning and guiding each of the terminals extending from each of the PMs 4a and 4b, and contributes to positioning of the control board 3 and each of the terminals.

Further, the holder 50 has a function of positioning and holding the control board 3 while ensuring a constant distance between the holder 50 and the control board 3 through the tubular columns 51.

Still further, the holder 50 is made of an insulating material, and therefore ensures insulation between the terminals of each of the PMs 4a and 4b.

In the PMs 4a and 4b, besides the line terminals 32a, 33a, 32b, and 33b extending from the PMs 4a and 4b to the control board 3, there exist the power supply terminals 4c and 4d that are required to be electrically connected to a connector assembly described later.

In the case of the power supply terminals 4c and 4d, the terminals may be extended to the connector assembly, which, however, affects the size of each of the PMs 4a and 4b itself.

In this embodiment, the power supply terminals 4c extended from the PM 4a and the power supply terminals 4d extended from the PM 4b are shortened in length, and extension terminals 2g illustrated in FIG. 4(c) are used so as to cope therewith.

As illustrated in FIG. 4(c), the holder 50 has formed therein the power supply holes 55 in which distal end portions of the third power supply terminals 4c are respectively exposed. A wall 57 is formed around each of the power supply holes 55. A base end portion of the extension terminal 2g and a distal end portion of the third power supply terminal 4c, which are indicated by the broken line, are fitted to be connected inside the wall 57.

Even for the PM 4b, a base end portion of the extension terminal 2g and a distal end portion of the fourth power supply terminal 4d are similarly fitted to be connected. As a result, similarly to the third power supply terminals 4c, the fourth power supply terminals 4d are connected to the connector assembly through the extension terminals 2g.

As illustrated in FIG. 5, the CPU 31 and the two drive ICs 36 including connections respectively to the PMs 4a and 4b and drive circuits in a first stage built therein are mounted as ICs on the control board 3. Besides, a large number of electronic components are mounted on both surfaces of the control board 3 although not illustrated.

In peripheries of portions immediately above the control holes 54 through which the motor control terminals 2c of the PMs 4a and 4b pass, control cutaway portions 80, each obtained by cutting away in a (U)-like shape, are formed. Further, in peripheries of portions immediately above the power supply holes 55, power supply cutaway portions 81, each obtained by cutting away in an (L)-like shape, are formed.

Further, a large number of line holes 70 for the line terminals 32a, 33a, 32b, and 33b of the PMs 4a and 4b are formed in a central portion of the control board 3. The line holes 70 are through holes. After the terminals 32a, 33a, 32b, and 33b pass through the line holes 70, distal end portions thereof are joined by soldering so that the line terminals 32a, 33a, 32b, and 33b are electrically connected to the CPU 31, the drive ICs 36, and the like.

Column holes 51a through which distal end portions of the tubular columns 51 extending from the surface of the holder 50 in a vertical direction can pass are formed at four positions on an edge portion of the control board 3. The control board 3 can be fixed to the holder 50 by, for example, thermally caulking the distal end portions of the tubular columns 51 after the distal end portions are caused to pass through the through holes 51a. Instead of the thermal caulking, holes may be formed in the distal end portions of the tubular columns 51 so that fastening with bolts is performed on the control board 3 side.

Figure 6:
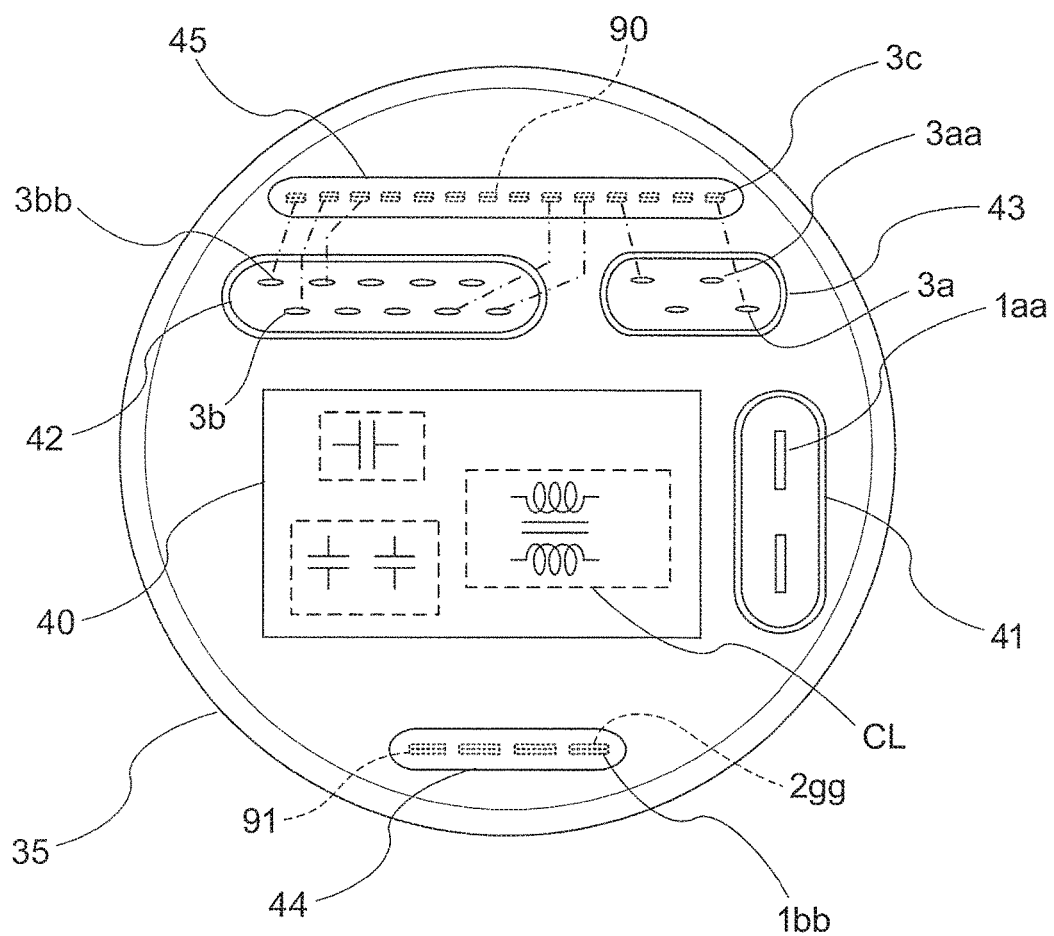
FIG. 6 is a plan view for illustrating a connector assembly illustrated in FIG. 2.

FIG. 6 is a top view of the device. On an upper surface of the case 35, the connector assembly integrated with the case 35 is provided.

The connector assembly includes a power supply connector 41 through which distal end portions 1aa of the first power supply terminals 1a being connector terminals are exposed, a sensor connector 42 through which distal end portions 3bb of the sensor terminals 3b being connector terminals are exposed, and a low power connector 43 through which distal end portions 3aa of the second power supply terminals 3a being connector terminals are exposed.

Base end portions of the sensor terminals 3b and base end portions of the second power supply terminals 3a are connected to junction terminals 3c respectively extending from a plane of the control board 3 in a vertical direction by welding.

In FIG. 6, some of connections therebetween are indicated by the alternate long and short dash lines.

A window portion 90 is formed in the connector assembly immediately above the junction terminals 3c. The base end portions of the sensor terminals 3b and the base end portions of the second power supply terminals 3a are guided to a portion above the window portion 90 separate from the CPU 31 and the drive ICs 36. Above the case 35, the terminals are welded to each other. Therefore, adverse effects of welding work on the CPU 31 and the drive ICs 36 can be suppressed.

Further, a third cover 45 configured to cover a welded portion of the terminals is provided on the window portion 90.

Similarly, end portions 1bb of junction terminals 1b (see FIG. 1) connected to the coils CL and the capacitors C1a and C1b without through the control board 3 are connected by welding to end portions 2gg of the extension terminals 2g that are connected to the third power supply terminals 4c of the PM 4a and the fourth power supply terminals 4d of the PM 4b.

A window portion 91 is formed in the connector assembly immediately above the end portions 1bb of the junction terminals 1b. The end portions 1bb of the junction terminals 1b and both end portions of the extension terminals 2g are guided to a portion above the window portion 91 separate from the CPU 31 and the drive ICs 36. Above the case 35, the end portions 1bb and 2gg of the terminals are welded to each other.

Further, a second cover 44 configured to cover welded portions 1bb and 2gg of the terminals is provided on the window portion 91.

A first cover 40 that covers components such as the coils CLa and CLb and the capacitors C1a and C1b illustrated in FIG. 1, which are relatively large-sized and are connected to a power supply system, is arranged on the connector assembly. The components are arranged in a space surrounded by the power supply connector 41, the second cover 44, the sensor connector 42, and the low power connector 43. Downsizing is achieved by using the space.

The capacitors C1a and C1b may be provided in a space between the holder 50 and the control board 3 or between the upper frame 27 and the connection ring 25 in the vicinity of the PMs 4a and 4b.

Even in this case, the extension terminals 2g illustrated in FIG. 4(c) are used for electrical connections between the capacitor C1a and the third power supply terminals 4c of the PM 4a and between the capacitor C1b and the fourth power supply terminals 4d of the PM 4b.

Further, when the capacitors C1a and C1b are arranged between the holder 50 and the control board 3, the extension terminals 2g extending upward in the drawing sheet are used as illustrated in FIG. 4(c). When the capacitors C1a and C1b are arranged in a lower part inside the upper frame 27, terminals extending downward in the drawing sheet are provided in addition to the extension terminals 2g illustrated in FIG. 4(c) so as to cope therewith by connection through press-fitting of leads of the capacitors C1a and C1b as in a case of, for example, a male pin and a female pin of a connector.

Next, a procedure of assembly of the device having the above-mentioned configuration is described.

The electric motor 2 including the rotor 21, the stator 22 and the motor windings 2a, 2b built in the housing 26, which is assembled integrally with the lower frame 28, is completed in the same manner as that of the related-art device.

Next, after the connection ring 25 is arranged on the top of the motor windings 2a and 2b, the terminals of the winding ends are connected, for example, are welded.

Next, after the upper frame 27 is arranged on the top of the electric motor 2, the distal end portions of the motor control terminals 2c are caused to project upward.

Next, after the PMs 4a and 4b are arranged on an upper surface of the upper frame 27, the holder 50 is mounted so that the molded bodies of the PMs 4a and 4b are fitted into the concave portions 56.

At this time, the line terminals 32a and 33a of the PM 4a and the line terminals 32b and 33b of the PM 4b pass through the line holes 53. The power supply terminals 4c and 4d are fitted into the power supply holes 55. The motor control terminals 2c pass through the control holes 54.

Thereafter, the holder 50 is fastened to the upper frame 27 by using the through bolts passing through the bolt through holes 52, thereby fixing the holder 50 to the upper frame 27.

Thereafter, the control board 3 on which the large number of electronic components are mounted is placed on the holder 50 through the tubular columns 51.

For mounting of the control board 3, the distal end portions of the line terminals 32a and 33a of the PM 4a and the line terminals 32b and 33b of the PM 4b pass through the line holes 70 of the control board 3, whereas the distal end portions of the motor control terminals 2c pass through the control cutaway portions 80 of the control board 3.

Next, the distal end portions of the line terminals 32a, 33a, 32b, and 33b are connected to the control board 3 by soldering.

Further, the distal end portions of the motor control terminals 2c of the PM 4a and the distal end portions of the motor control terminals 2e of the PM 4b are connected to the distal end portions of the winding terminals 2d and 2f by welding, which extend along the same direction as that of the motor control terminals 2c and 2e so as to project above the control board 3.

Thereafter, the case 35 integrated with the connector assembly is placed on the top of the upper frame 27 under a state in which the first cover 40, the second cover 44, and the third cover are not mounted.

At this time, the base end portions of the sensor terminals 3b and the base end portions of the second power supply terminals 3a project externally from the window portion 90. Further, the end portions 1bb of the junction terminals 1b and the end portions 2gg of the extension terminals 2g project externally from the window portion 91.

Thereafter, after the end portions thereof are connected by welding, the window portions 90 and 91 are respectively closed with the third cover 45 and the second cover 44. Simultaneously, the CLa and CLb and the capacitors C1a and C1b, which are integrated with the connector assembly, are covered with the first cover 40, thereby terminating assembly work for the device.

According to the device having the above-mentioned configuration, on the control board 3, connection work between the line terminals 32a, 33a, 32b, and 33b and the control board 3 is performed through soldering, and connection work between the motor control terminals 2c and 2e and the winding terminals 2d and 2f is performed through welding. Further, on the connector assembly, connection work between the sensor terminals 3b, the second power supply terminals 3a, and the junction terminals 3c is performed through welding, and connection work between the junction terminals 1b and the extension terminals 2g is performed through welding.

As described above, the main connection work is concentrated on two positions, that is, on the control board 3 and on the connector assembly. Thus, each of assembly steps is simplified, and thus ease of assembly is improved, which is in turn effective in shortening of assembly time.

Second Embodiment

Figure 7:
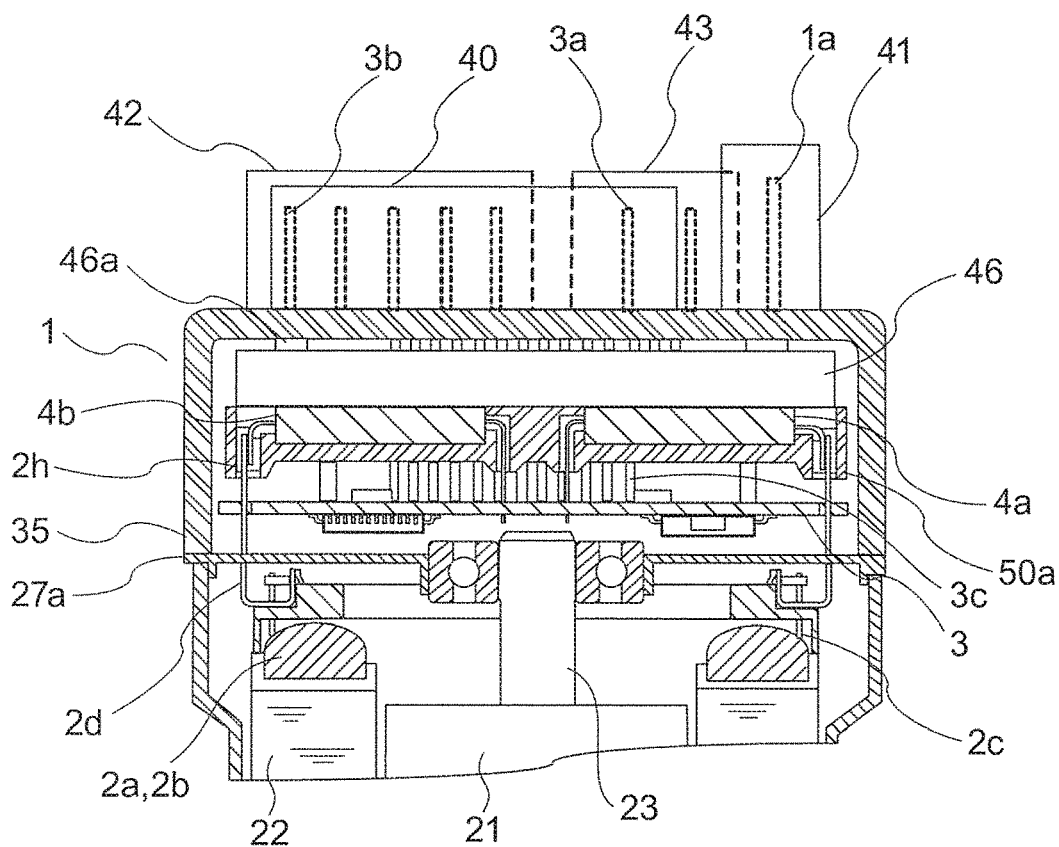
FIG. 7(a) is a sectional view of a main part of an electric power steering device according to a second embodiment of the present invention.
FIG. 7(b) is a view of the main part of the electric power steering device, which is obtained by cutting the electric power steering device in a direction at a right angle with respect to a cut plane of FIG. 7(a).
Figure 7:
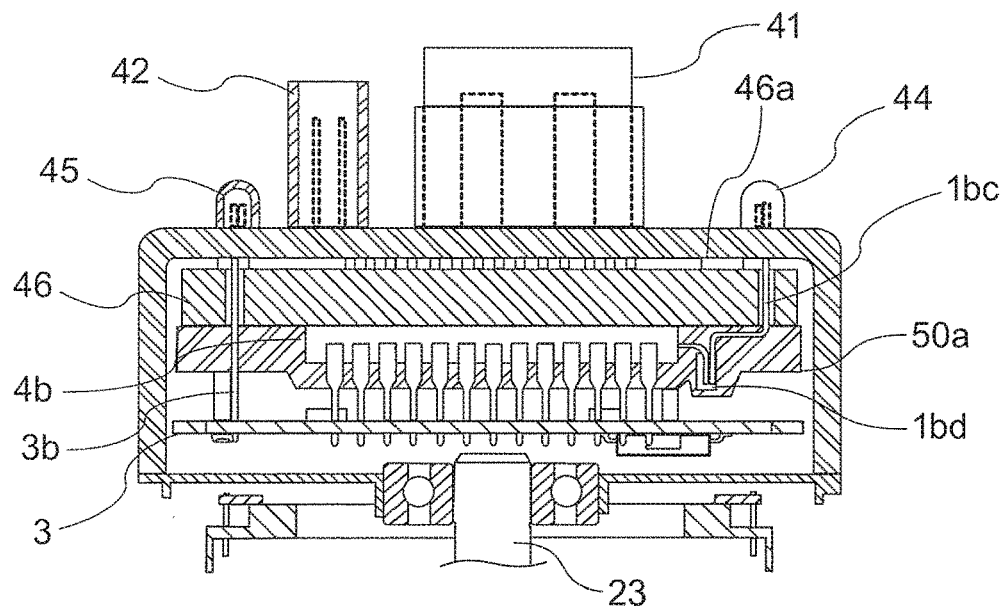

FIG. 7(a) is a sectional view of a main part of a device according to a second embodiment of the present invention, which is obtained by cutting the device across the pair of PMs 4a and 4b, and FIG. 7(b) is a sectional view of the PM 4b of FIG. 7(a), which is obtained by cutting the PM 4b along a longitudinal direction thereof.

In this embodiment, in comparison to that of the first embodiment, which is illustrated in FIG. 2, the PM 4a and the PM 4b, a holder 50a, and the control board 3 are placed in a reverse order.

Further, an upper frame 27a is provided as a partition wall between the electric motor 2 and the control unit 1. In this case, the upper frame 27a is not brought into contact with the PMs 4a and 4b and is not required to have a function as a heat sink. Therefore, the upper frame 27a has a thin plate-like shape.

The control unit 1 is mounted on the top of the upper frame 27a. The control unit 1 includes the control board 3 as a lowermost layer, the holder 50a and the PMs 4a and 4b provided thereon, a heat sink 46 provided thereon, and the connector assembly integrated with the case 35 provided in an uppermost portion.

The heat sink 46 is separate from a top surface of the case 35 through leg portions 46a, and a bottom surface thereof is held in contact with upper surfaces of the PMs 4a and 4b.

Functions of the holder 50a are similar to those in the first embodiment, and include positioning and pressing of the PMs 4a and 4b with respect to and against the heat sink 46, ensuring of a predetermined distance from the control board 3, and fixation of the control board 3.

The structure between the PMs 4a and 4b and the control board 3 is the same as that obtained by inverting the structure of the first embodiment. Further, the same applies to electrical connections.

However, the connector assembly is arranged on the side opposite to the control board 3. Therefore, a length and a shape of each of the terminals 3c extended to the connector assembly are different.

The heat sink 46 is fixed to the case 35 through the leg portions 46a, and has a large number of holes for passage of extension terminals 1bc (corresponding to the extension terminals 2g of FIG. 4(c)) that are connected to the terminals 3a and 3b, the power supply terminals 4c of the PM 4a, and the power supply terminals 4d of the PM 4b therethrough.

In the device of the first embodiment, the space between the top surface of the case 35 and the control board 3 can be used for welding between the motor control terminals 2c and the winding terminals 2d.

On the other hand, in the second embodiment, there is no space in which both the terminals 2c and 2d are welded. Therefore, the winding terminals 2d are extended to the bent motor control terminals 2c of the PMs 4a and 4b so that both the terminals are press-fitted with different joint members 2h.

The power supply terminals 4c and 4d and the extension terminals 1bc are connected by press-fitting with joint members 1bd.

Each of the joint members 2h and 1bd is, for example, a cuboid with a hole, and has the structure similar to male-female fitting of a connector or press-fit. The joint members are placed in the holes of the holder 50a. Both the terminals are inserted into the holes of the joint members 2h and 1bd so that the three are held in contact with each other, thereby achieving the electrical connections.

Next, a procedure of assembly of the device having the above-mentioned configuration is described.

The partition wall 27a is mounted on the electric motor 2. Then, two sets of the three winding terminals 2d and the three winding terminals 2f are extended. The heat sink 46 is mounted inside the case 35 integrated with the connector assembly. Thereafter, the PMs 4a and 4b are mounted.

Next, the joint members 2h and 1bd are inserted into the relatively large control holes 54 and power supply holes 55 (FIG. 4(a)) of the holder 50a. After the extension terminals 1bc are mounted, the power supply terminals 4c of the PM 4a and the power supply terminals 4d of the PM 4b are inserted into the power supply holes 55. Further, after the terminals 32a and 33a of the PMs 4a and 4b are inserted into the large number of other line holes 53, the holder 50a is fixed to the heat sink 46.

In this manner, the PMs 4a and 4b are positioned and are held in close contact with the heat sink 46.

Next, the control board 3 is mounted to the holder 50a, while the sensor terminals 3b and the junction terminals 3c pass through the holes of the heat sink 46 to project from the upper surface of the case 35. The distal end portions of the line terminals 32a and 33a of the PM 4a and the line terminals 32b and 33b of the PM 4b pass through the through holes of the control board 3, and therefore are soldered there.

In the above-mentioned manner, the control unit 1 to be built in the case 35 is entirely arranged.

The control unit 1 is inserted from an upper side of the electric motor 2 so that the six motor control terminals 2c and the joint members 2h of the holder 50a are aligned at six positions.

By the above-mentioned insertion, the motor windings 2a and 2b and the PM 4a and the PM 4b are respectively electrically connected to each other.

Finally, the large number of terminals 1a, 3a, 3b, and 1bc projecting from the upper surface of the case 35 are respectively welded and are covered with the second cover 44 and the third cover 45, thereby completing the assembly.

The heat sink 46 is not limited to the built-in structure inside the upper surface of the case 35, and may have the structure in which a space is provided above the upper surface of the case 35 through concentrated arrangement of the portions of the connector assembly so that the upper surface of the heat sink 46 is partially exposed in the space. Through the exposure, the heat radiation properties are further improved.

As described above, even when the order of placement is changed in the control unit 1, connection processing is performed in two steps corresponding to soldering on the control board 3 and welding on the case 35. The other connections are achieved simultaneously in a step of inserting the portions, which is included in the assembly steps, thereby providing the effect of improving the ease of assembly.

Third Embodiment

FIG. 8(a) is a plan view of a state in which a heat sink 61a is removed from a device according to a third embodiment of the present invention, and FIG. 8(b) is a sectional view when viewed in a direction of the arrows taken along the line A-A in FIG. 8(a).

In this embodiment, the control unit 1 is arranged on the output side of the electric motor 2 unlike the devices according to the first embodiment and the second embodiment.

Even with the above-mentioned arrangement, two types are conceived as the order of arrangement of the PMs 4a and 4b, the control board 3, and the like as in the case of the first embodiment and the second embodiment.

Specifically, there exist the structure in which the heat sink is arranged on the speed reducer 29 side and is held in close contact with the PMs 4a and 4b and the structure in which the control board 3 is provide on the speed reducer side. The device illustrated in FIGS. 8 corresponds to an example of the former structure.

A case 61 has a cylindrical shape, and has an output shaft hole 60 formed in the center, through which the output shaft 23 passes. A power supply connector portion 41a, a sensor connector portion 42a, and a low power connector portion 43a, each projecting in a radial direction, and a first cover portion 40a corresponding to the first cover 40 of the first embodiment and the second embodiment, are arranged on an outer periphery of the case 61 so as to be integral with the case 61.

Further, the case 61 has a partition wall 27b from the electric motor 2. The heat sink 61a, the PMs 4a and 4b, a holder 50b, and a control board 3d are sequentially mounted from the speed reducer side.

The terminal end portions 1a and 3a of the power supply connector portion 41a, the sensor connector portion 42a, and the low power connector portion 43a are connected to both wings of the control board 3d in FIG. 8(b).

However, the connections are not required to be direct connections. As in the first embodiment and the second embodiment, extension terminals may be used so that one end portions thereof and the control board 3d may be connected, whereas another end portions thereof and the terminal end portions 1a and 3a are connected.

In any of the structures, the connection between the end portions is implemented from an upper side in FIG. 8(b). Therefore, window portions are formed in the power supply connector portion 41a and the low power connector portion 43a. Through the window portions, the connection work is performed through soldering, welding, or the like. After the work, the window portions are closed by using covers 44a and 45a.

The pressing and the positioning of the PMs 4a and 4b, the guiding of each of the terminals, and the positioning of the control board 3d, which are functions of the holder 50b, are similar to those in the first embodiment and the second embodiment.

In this device, under a state in which the PMs 4a and 4b, the holder 50b, and the control board 3d are respectively built in the case 61 integral with the power supply connector portion 41a, the sensor connector portion 42a, and the low power connector portion 43a, combination (arrow in FIG. 8(b)) is carried out so that the winding terminals 2d and 2f of the electric motor 2, and the motor control terminals 2c of the PM 4a and the motor control terminals 2e of the PM 4b come into contact with each other.

The terminals 2c and 2e are electrically connected by using joint members similar to those used in the device of the second embodiment.

When the case 61 is formed from a molded component of a resin material as in the case of the holder 50b, the degree of freedom in shape is improved.

In this embodiment, the holder 50b is made of a resin. Therefore, the heat sink for heat radiation from the PMs 4a and 4b is required, and therefore the heat sink 61a is held in close contact with the PMs 4a and 4b.

When a surface of the speed reducer is flat, the PMs 4a and 4b may be directly mounted to the speed reducer.

Further, the partition wall 27b that separates the electric motor 2 and the control unit 1 from each other may be independent of the case 61.

Further, the case 61 may be vertically divided in the vicinity of the control board 3d into two, that is, an upper case portion and a lower case portion so that the heat sink 61a and the upper case portion are integrally manufactured of a metal, for example, aluminum, and the lower case portion and the connector assembly are manufactured integrally of a resin. By dividing the case 61 into two, the connection work between the control board 3d and each of the portions is facilitated.

Figure 8:
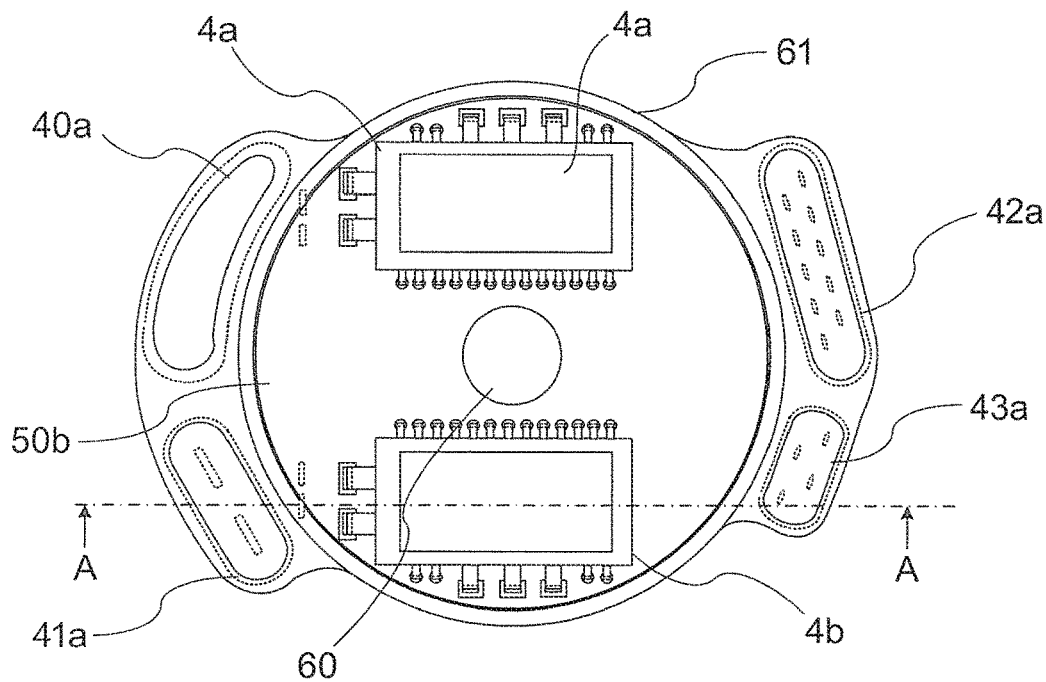
FIG. 8(a) is a plan view of a main part of an electric power steering device according to a third embodiment of the present invention.
FIG. 8(b) is a sectional view when viewed in a direction of the arrows taken along the line A-A in FIG. 8(a).
Figure 8:
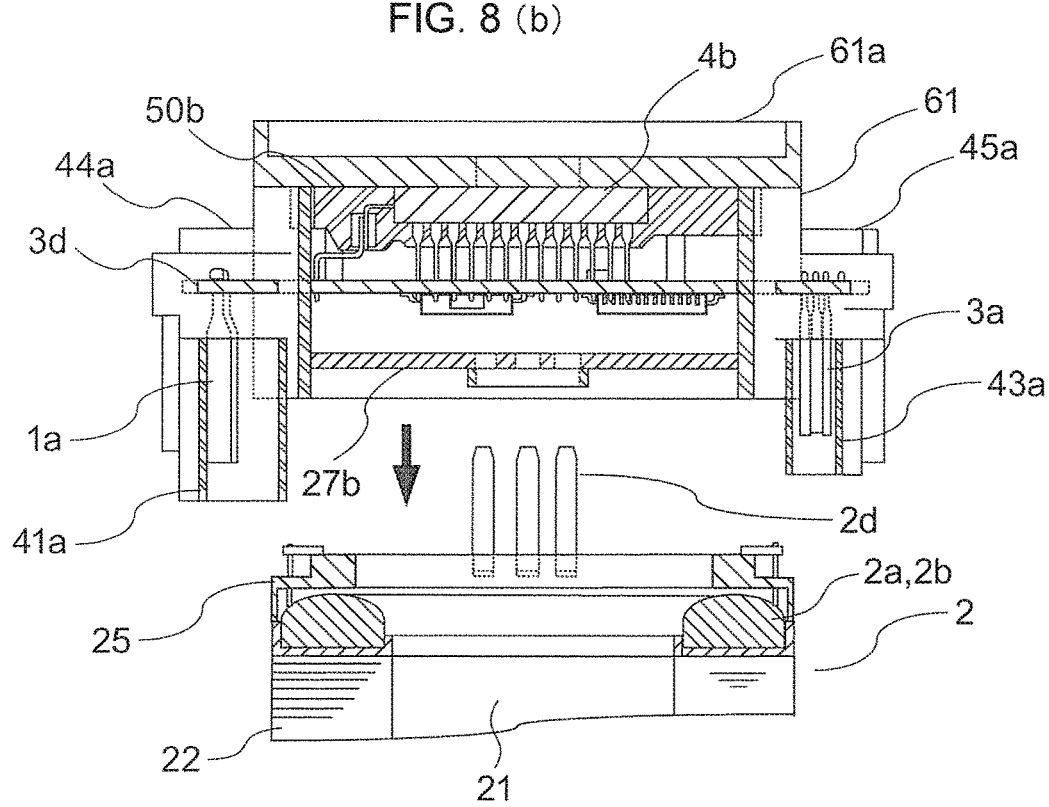

Further, orientations of the power supply connector portion 41a, the sensor connector portion 42a, and the low power connector portion 43a illustrated in FIGS. 8 are set opposite, that is, to the speed reducer side. Further, the electric motor 2 can be deformed radially outward.

In this embodiment, the connections are performed only at three positions, that is, the connection at the power supply connector portion 41a, the sensor connector portion 42a, and the low power connector portion 43a, which is an electrical connection, the connection at the motor windings 2a and 2b, and the connection between the PMs 4a and 4b and the control board 3d. Thus, workability is improved.

Further, the control board 3d and the PMs 4a and 4b are connected by soldering before the assembly. The motor windings 2a and 2b and the PMs 4a and 4b are completed in the step of assembling the case 61 and the electric motor 2. The connection portions at the power supply connector portion 41a, the sensor connector portion 42a, and the low power connector portion 43a are oriented in the same direction, and therefore it is easy to implement the work.

Fourth Embodiment

Figure 9:
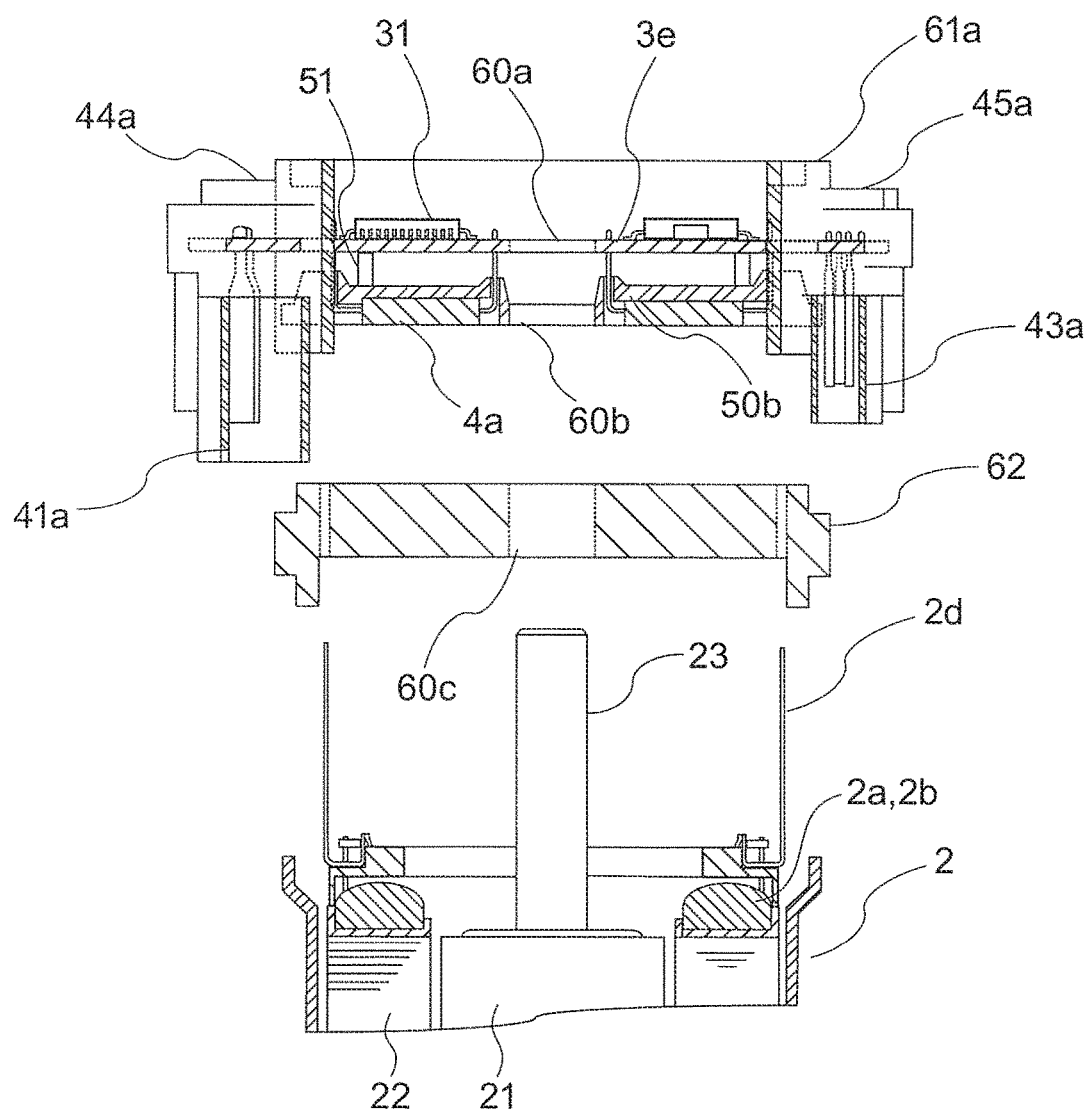
FIG. 9 is an exploded sectional view of an electric power steering device according to a fourth embodiment of the present invention.

FIG. 9 is an exploded view for illustrating a device according to a fourth embodiment of the present invention.

This embodiment differs from the device of the third embodiment in that the PMs 4a and 4b are arranged on the electric motor 2 side and a control board 3e is arranged on the speed reducer side.

In this embodiment, the PMs 4a and 4b, the holder 50b, and the control board 3e are arranged inside a case 61a from a lower side in FIG. 9. Further, the case 61a is integrated with the power supply connector portion 41a and the low power connector portion 43a provided on both wings in FIG. 9.

Further, holes 60a, 60b, and 60c, through which the output shaft 23 passes, are respectively formed in a central portion of the control board 3e, a central portion of the holder 50b, and a central portion of a frame 62.

The frame 62 made of aluminum and having a large thickness forms a boundary wall between the control unit 1 and the electric motor 2. The PMs 4a and 4b are held in close contact therewith so that the frame 62 also has a function as the heat sink. Columns 51 are provided so as to stand vertically from the holder 50b. End portions of the columns 51 are inserted into holes of the control board 3e, thereby positioning the control board 3e with respect to the holder 50b.

The connection of the power supply connector portion 41a and the low power connector portion 43a respectively to the terminal end portions 1a and 3a is the same as that in the third embodiment.

On the other hand, the motor winding terminals 2d and 2f pass through through holes of the frame 62 and the holder 50b to extend above the control board 3e. In this state, the motor control terminals 2c of the PM 4a and the motor winding terminals 2d of the PM 4b are welded so as to be connected.

When the case 61a is formed of a resin by molding, there are advantages in that the degree of freedom in shape is improved and the power supply connector portion 41a and the low power connector portion 43a can be integrated.

Further, there exists no partition wall from the speed reducer 29 side, and therefore the control board 3e is in an exposed state. However, a partition wall may be provided so that the partition wall is mounted after overall assembly.

Further, the power supply connector portion 41a and the low power connector portion 43a may be oriented to the speed reducer 29 side or to a radially outer side of the electric motor 2.

According to the device of this embodiment, the electrical connecting positions and steps of the portions can be reduced so that the workability in assembly can be improved. Thus, the entire device can be downsized.

The invention claimed is:

1. An electric power steering device, comprising:
   a controller; and
   an electric motor,
   the controller being configured to control drive of the electric motor and being arranged coaxially with an output shaft of the electric motor on a side opposite to an output side of the output shaft, the controller and the electric motor being integrated with each other through connection between a motor control terminal of the controller and a winding terminal of the electric motor,
   the controller comprising:
      a case;
      a connector assembly, which is provided on an outer side of the case;
      a heat sink, which is configured to close an opening portion of the case to form a space in cooperation with the case;
      a power module, which is placed on the heat sink within the space, and is configured to supply power to the electric motor;
      a holder, which is configured to press the power module against the heat sink to bring the power module in close contact with the heat sink, and to position the power module; and
      a control board, which is provided so as to be separate from the holder, the control board having mounted thereon a central processing unit (CPU) configured to control drive of the electric motor,
   the power module comprising a plurality of terminals including the motor control terminal and a power supply terminal connected to a power supply, each having a distal end portion being oriented toward the control board,
   the holder having holes through which the plurality of terminals pass, the plurality of terminals each having the distal end portion to be connected to the control board,
   the winding terminal having a distal end portion to be connected to the distal end portion of the motor control terminal,
   the controller further comprising a junction terminal, the junction terminal and the power supply terminal each having a distal end portion extending from the control board toward the connector assembly,
   wherein the distal end portion of each of the junction terminal and the power supply terminal that is protruded out of the control board is directly connected to connector terminals of the connector assembly.

2. The electric power steering device according to claim 1, wherein the holder has a concave portion into which the power module is fitted, and
   wherein the power module is disposed on and in contact with a surface of the concave portion of the holder.

3. The electric power steering device according to claim 1,
   wherein the heat sink is provided close to a motor winding of the electric motor.

4. The. electric power steering device according to claim 1, wherein the control board is provided close to a motor winding of the electric motor.

5. The electric power steering device according to claim 1, wherein the winding terminal of the electric motor passes through the holder and the control board and projects from the control board.

6. The electric power steering device according to claim 4, wherein the winding terminal of the electric motor and the motor control terminal of the power module are electrically connected through a connection member arranged on the holder.

7. The electric power steering device according to claim 1,
   wherein the connector terminals of the connector assembly include at least a power supply terminal and a sensor terminal, and
   wherein each of the terminals extends in the same direction as a direction in which the output shaft of the electric motor extends.

8. An electric power steering device, comprising:
   a controller; and
   an electric motor,
   the controller being configured to control drive of the electric motor and being arranged coaxially with an output shaft of the electric motor on an output side of the output shaft, the controller and the electric motor being integrated with each other through connection between a motor control terminal of the controller and a winding terminal of the electric motor,
   the controller comprising:
      a case;
      a connector assembly, which is provided on a radially outer side of the case;
      a heat sink, which is provided inside the case;
      a power module, which is placed on the heat sink, and is configured to supply power to a motor winding of the electric motor;
      a holder configured to press the power module against the heat sink to bring the power module in close contact with the heat sink, and to position the power module; and a control board provided so as to be separate from the holder, the control board having mounted thereon a central processing unit (CPU) configured to control drive of the electric motor, the power module comprising a plurality of terminals including the motor control terminal and a power supply terminal connected to a power supply, each having a distal end portion being oriented toward the control board, the holder having holes through which the plurality of terminals pass, the terminals each having the distal end portion to be connected to the control board, the winding terminal having a distal end portion to be connected to the distal end portion of the motor control terminal, the controller further comprising a junction terminal, the junction terminal and the power supply terminal each having a distal end portion extending from the control board toward the connector assembly, wherein the distal end portion of each of the junction terminal and the power supply terminal that is protruded out of the control board is directly connected to connector terminals of the connector assembly.

9. An electric power steering device, comprising:
a control unit: and
an electric motor.
the control unit heir configured to control drive of the electric motor and being of the output shaft, the control unit and the electric motor being integrated with each other through connection between a motor control terminal of the control unit and a winding terminal of the electric motor.
the control unit comprising:
a case;
a connector assembly, which is provided on an outer side of the case:

heat sink, which is configured to close an opening portion of the case to form a space in cooperation with the case;

a power module, which is placed on the heat sink within the space, and is configured to supply power to the electric: motor;

a holder, which is configured to press the power module against the heat sink to bring the power module in close contact with the heat sink, and to position the power module: and a control board, which is provided so as to be separate from the holder, the control board haying mounted thereon a central processing unit (CPU) configured to control drive or the electric motor, the power module comprising a plurality of terminals including the motor control terminal and a power supply terminal connected to a power supply, each having a distal end portion being oriented toward the control board, the holder having holes through which the plurality of terminals pass, the terminals each Davin the distal end portion to be connected to the control board, the winding terminal having a distal end portion to be connected to the distal end portion of the motor control terminal, the control unit further comprising a junction terminal, the junction terminal and the power supply terminal each having a distal end portion extending from the control board toward the connector assembly being respectively connected to connector terminals of the connector assembly, wherein the connector assembly has window portions formed at portions opposed to connecting portions of the junction terminal and the power supply terminal connected to the connector terminals, and covers configured to close the window portions.

* * * * *